(12) United States Patent
Wang et al.

(10) Patent No.: US 12,085,962 B2
(45) Date of Patent: Sep. 10, 2024

(54) NIGHTTIME COOPERATIVE POSITIONING METHOD BASED ON UNMANNED AERIAL VEHICLE GROUP

(71) Applicant: Northwestern Polytechnical University, Shaanxi (CN)

(72) Inventors: Zhen Wang, Shaanxi (CN); Tao Zhang, Shaanxi (CN); Dengxiu Yu, Shaanxi (CN); Chao Gao, Shaanxi (CN); Xuelong Li, Shaanxi (CN)

(73) Assignee: Northwestern Polytechnical University, Xi'an (CN)

( * ) Notice: Subject to any disclaimer, the term of this patent is extended or adjusted under 35 U.S.C. 154(b) by 0 days.

(21) Appl. No.: 18/403,503

(22) Filed: Jan. 3, 2024

(65) Prior Publication Data

US 2024/0272650 A1    Aug. 15, 2024

(30) Foreign Application Priority Data

Feb. 13, 2023    (CN) .......................... 202310106488.5

(51) Int. Cl.
*G05D 1/695* (2024.01)
*B64D 47/06* (2006.01)
(Continued)

(52) U.S. Cl.
CPC ............. *G05D 1/695* (2024.01); *B64D 47/06* (2013.01); *G05D 1/249* (2024.01); *G05D 1/46* (2024.01);
(Continued)

(58) Field of Classification Search
CPC ............... B64D 47/08; B64D 2203/00; B64U 2101/30; B64U 2201/20; G05D 1/695; G05D 1/249; G05D 1/43; G05D 2109/254; G05D 2111/10; G05D 1/00–1/87; G05D 1/0022; G05D 1/0094; G05D 1/6445;
(Continued)

(56) References Cited

U.S. PATENT DOCUMENTS 11,238,281 B1 *  2/2022  Cui .......................... G05D 1/101
11,861,896 B1 *  1/2024  Wang ...................... G06V 10/60
(Continued)

FOREIGN PATENT DOCUMENTS

CN    107831783 A    3/2018
CN    108052110 A    5/2018
(Continued)

*Primary Examiner* — Mohamed Abdo Algehaim

(57) ABSTRACT

Disclosed is a nighttime cooperative positioning method based on an unmanned aerial vehicle (UAV) group, falling within the technical field of aircraft navigation and positioning. According to the present disclosure, the cooperative visual positioning and the collision warning for UAVs are realized by means of light colors of the UAVs, respective two-dimensional turntable cameras and a communication topology network, without adding additional equipment and without relying on an external signal source, avoiding external interference. Compared with the positioning method in a conventional manner, in the present disclosure, the system is effectively simplified, and the cooperative positioning among the interiors of a UAV cluster can be realized relatively simply and at a low cost to maintain the formation of the UAV group.

6 Claims, 3 Drawing Sheets

(51) Int. Cl.
  *G05D 1/249* (2024.01)
  *G05D 1/46* (2024.01)
  *G05D 109/25* (2024.01)
  *G05D 111/10* (2024.01)
  *G06T 7/73* (2017.01)
  *G08G 5/00* (2006.01)
  *H04N 23/695* (2023.01)

(52) U.S. Cl.
  CPC .............. *G06T 7/74* (2017.01); *G08G 5/0008* (2013.01); *G08G 5/0021* (2013.01); *G08G 5/0052* (2013.01); *G08G 5/0069* (2013.01); *G08G 5/0078* (2013.01); *H04N 23/695* (2023.01); *B64D 2203/00* (2013.01); *B64U 2201/102* (2023.01); *G05D 2109/254* (2024.01); *G05D 2111/10* (2024.01); *G06T 2207/10024* (2013.01); *G06T 2207/10032* (2013.01)

(58) Field of Classification Search
  CPC .............. G05D 1/689; G05D 2111/65; G05D 2111/63; G06T 7/74; G06T 2207/10024; G06T 2207/10032; G08G 5/04; H04N 23/695
  USPC ............................................ 701/2; 700/1–199
  See application file for complete search history.

(56) References Cited

U.S. PATENT DOCUMENTS

| | | | | |
|---|---|---|---|---|
| 2014/0236388 A1* | 8/2014 | Wong | ...................... | G09G 5/02 244/17.23 |
| 2014/0374535 A1* | 12/2014 | Wong | ...................... | G09G 5/02 244/17.23 |
| 2017/0138732 A1* | 5/2017 | Pettersson | ............ | B64C 39/024 |
| 2017/0193781 A1* | 7/2017 | Bryson | .............. | G08B 13/1965 |
| 2017/0210486 A1* | 7/2017 | O'Brien | ................. | H04N 23/55 |
| 2017/0372625 A1* | 12/2017 | Horinouchi | ........... | B64C 39/024 |
| 2018/0067502 A1* | 3/2018 | Chi-Hsueh | ............. | G07C 5/008 |
| 2018/0074520 A1* | 3/2018 | Liu | ........................ | B64C 39/024 |
| 2018/0164820 A1* | 6/2018 | Aboutalib | ................. | B64C 3/56 |
| 2018/0357909 A1* | 12/2018 | Eyhorn | ................. | G08G 5/0039 |
| 2019/0114925 A1* | 4/2019 | Schulman | ............ | G08G 5/0082 |
| 2019/0146501 A1* | 5/2019 | Schick | .................... | G09F 21/06 701/3 |
| 2019/0176987 A1* | 6/2019 | Beecham | .............. | G08B 17/005 |
| 2019/0246626 A1* | 8/2019 | Baughman | ............ | A01M 31/06 |
| 2019/0291893 A1* | 9/2019 | Hörtner | ................. | B64C 39/024 |
| 2019/0373173 A1* | 12/2019 | Wang | ...................... | B64U 20/87 |
| 2020/0108923 A1* | 4/2020 | Smith | ...................... | G05D 1/0094 |
| 2020/0108926 A1* | 4/2020 | Smith | ........................ | G05D 1/12 |
| 2020/0404163 A1* | 12/2020 | Hörtner | ................. | G06Q 10/00 |
| 2021/0129989 A1* | 5/2021 | Schuett | ................. | G03B 35/12 |
| 2021/0255645 A1* | 8/2021 | Wang | ................... | G08G 5/0021 |
| 2021/0300555 A1* | 9/2021 | Ali | ................... | G08G 5/0034 |
| 2021/0403159 A1* | 12/2021 | Dey | ................... | G08G 5/0052 |
| 2022/0285836 A1* | 9/2022 | Badichi | ................ | G08G 5/0043 |
| 2023/0058405 A1* | 2/2023 | Chen | .................... | B64C 39/024 |
| 2023/0109390 A1* | 4/2023 | Wang | ...................... | G05D 1/104 701/120 |
| 2023/0410662 A1* | 12/2023 | Sha | ......................... | H04W 4/40 |

FOREIGN PATENT DOCUMENTS

| | | |
|---|---|---|
| CN | 110119158 A | 8/2019 |
| CN | 112631329 A | 4/2021 |
| CN | 113821052 A | 12/2021 |
| CN | 115097846 A | 9/2022 |
| CN | 115651204 A | 1/2023 |
| WO | 2022247597 A1 | 12/2022 |

* cited by examiner

NIGHTTIME COOPERATIVE POSITIONING METHOD BASED ON UNMANNED AERIAL VEHICLE GROUP

CROSS-REFERENCE TO RELATED APPLICATIONS

This application claims priority of Chinese Patent Application No. 202310106488.5, filed on Feb. 13, 2023, the entire contents of which are incorporated herein by reference.

TECHNICAL FIELD

The present disclosure relates to the technical field of aircraft navigation and positioning, in particular to a nighttime cooperative positioning method based on an unmanned aerial vehicle (UAV) group.

BACKGROUND

With the development of science and technology, UAV clusters have broad application prospects in military and civil fields, especially for vicinageearth security under the future-oriented near-ground security system. The UAV clusters have many advantages, such as strong combat capability, high system survival rate and low attack cost, which are of great significance for the protection, production, safety and rescue of industrial production, social economy, scientific research and education, as well as for national defense security, social stability and economic development. How to obtain the high-precision and high-reliability relative space-time relationship among UAVs in the cluster is very important for the flight safety and mission execution of UAV cluster. Therefore, there is an increasing demand and necessity for fast, economical and high quality unmanned cluster cooperative positioning technology.

At present, domestic and foreign scholars have made rich achievements in the autonomous relative positioning of UAV cluster, and put forward a series of methods, such as laser pulse ranging and positioning, UWB ranging and positioning, vision ranging and positioning, ultrasonic ranging and positioning, and radio ranging and positioning, which are widely used in various fields. The laser pulse ranging and positioning has extremely high costs; the UWB ranging and positioning has poor stability, and may also interfere with other wireless communications; the ultrasonic ranging and positioning has a slow acquisition speed and a small application scope; and the radio ranging and positioning is easily interfered and has poor reliability. Compared with other methods, the vision positioning has the advantages of low cost, passive sensing, and low detectability, and is one of the important research directions in the future. However, the existing vision ranging and positioning mainly uses a binocular camera, which has heavy computation task and cannot meet the requirements of night use.

Meanwhile, the ultimate goal of UAV cluster application is to adapt to all-weather and all-scene requirements, so the main challenge is from the complex environment. At present, there have been many related research results in the complex geographical and meteorological environment. However, there are few researches on the cooperative positioning perception relying on the UAV itself at night, and night is one of the important application scenarios of the UAV cluster, especially in the military field. Therefore, there is a need for a nighttime internal visual cooperative positioning method for a UAV group to ensure the normal operation of the UAV cluster in the nighttime environment.

SUMMARY

In view of the above-mentioned deficiencies of the prior art, an object of the present disclosure is to provide a nighttime cooperative positioning method based on a UAV group.

In order to achieve the above object, the technical solutions adopted by the present disclosure are as follows.

A nighttime cooperative positioning method based on a UAV group, one UAV group including 5 UAVs, each of the UAVs including a two-dimensional turntable camera and an LED light, includes the following steps:

step 1: arranging an unmanned cluster formation before take-off arranging a UAV 1, a UAV 2, a UAV 3 and a UAV 4 of the UAV group according to a rectangular formation in sequence at a take-off site, and arranging a UAV 0 at a center of the rectangle, namely, an intersection point of diagonal lines of the rectangle, ensuring that an initial actual distance between adjacent UAVs is greater than a sum of safe radii of each other, and ensuring that LED lights of the UAVs 1 and 2 ahead of a heading of the UAV 0 are not present in a camera line-of-sight range of the UAV 0, step 2: powering on the unmanned cluster formation, step 3: setting LED light colors of each of UAVs setting LED lights of two UAVs on opposite corners of the rectangle to be color I, setting LED lights of two UAVs on the other opposite corners of the rectangle to be color II, and setting an LED light of the UAV 0 to be color III, color I, color II and color III being different colors, step 4: performing automatic benchmark construction before the UAVs take off, including positioning benchmark construction and time benchmark construction, step 5: controlling the take-off of UAV 0 by a control instruction of an external system, and at the same time, sending, by the UAV 0, an anti-collision warning instruction to the UAV 1 or 2 through a communication topology when the LED light of the UAV 1 or 2 enters a camera viewing angle range of the UAV 0 in the flight process, that is, when an LED light pixel point of the color I or II appears in a camera imaging plane of the UAV 0, and step 6: real-time pixel coordinate values of the LED light with color III of the UAV 0 in camera imaging planes of UAVs 1-4 being changed with the take-off action of UAV 0, calculating deviations between the real-time pixel coordinate values and pixel coordinate values (x10, y10)-(x40, y40) stored in the ground records of the UAVs 1-4 by attitude controllers of the UAVs 1-4 to finally follow the take-off action of UAV 0 by closed-loop control.

Further, the positioning benchmark construction specifically includes the following steps:

step 4.1.1: setting an included angle $\alpha_0$ between an axis of a two-dimensional turntable camera of UAV 0 and a heading of UAV 0 as zero;

step 4.1.2: searching for the LED light with color III of the UAV 0 as the UAVs 1-4 automatically rotate two-dimensional turntable cameras clockwise, to cause the LED light with color III to be located at a horizontal center of the camera imaging plane;

step 4.1.3: recording and storing included angle values $\alpha_0$-$\alpha_4$ between axes of the two-dimensional turntable cameras of UAVs 0-4 and headings of UAVs 0-4 at this moment;

step 4.1.4: starting a closed-loop maintenance control program of the included angle of the two-dimensional turntable camera to cause the included angle values of $\alpha_0$-$\alpha_4$ to be consistent with the recorded and stored values before take-off in the subsequent whole flight process;

step 4.1.5: recording and storing pixel coordinate values (x10, y10)-(x40, y40) of an LED light spot with color III of the UAV 0 in the camera imaging planes of the UAVs 1-4 at this moment; and at the same time, recording and storing pixel coordinates (x12, y12) and (x21, y21) of the LED light of the UAVs 1 and 2 in the camera imaging planes of the other parties at this moment, and pixel coordinates (x34, y34) and (x43, y43) of the LED light of the UAVs 3 and 4 in the camera imaging planes of the other parties; and step 4.1.6: acquiring, by the UAV 1, pixel coordinates (x21, y21) and (x41, y41) of the UAV 1 in the camera imaging planes of the UAVs 2 and 4 to acquire cooperative positioning benchmark information of the UAV 1 in the cluster as {(x10, y10), (x21, y21), (x41, y41)} by means of a directed communication topology; in a similar way, acquiring, by the UAVs 2-4, cooperative positioning benchmark information of the UAVs 2-4 in the cluster as {(x20, y20), (x12, y12), (x32, y32)}, {(x30, y30), (x23, y23), (x43, y43)} and {(x40, y40), (x14, y14), (x34, y34)}; and taking the cooperative positioning benchmark information as subsequent position control instructions of the UAVs 1-4.

Further, the time benchmark construction includes: the synchronization of communication clocks among UAVs.

Further, in the flight process, the position change of any one of UAVs 1-4 leads to a deviation between a real-time monitored pixel coordinate value of the LED light of each of UAVs and the cooperative positioning benchmark, to maintain the formation of the UAV group by the attitude closed-loop controller.

Further, the directed communication topology in step 4.1.6 is specifically: the UAV 1 has a bidirectional communication relationship with the UAVs 2 and 4; the UAV 3 has a bidirectional communication relationship with the UAVs 2 and 4; the UAV 1 has no communication relationship with the UAV 3, the UAV 2 has no communication relationship with the UAV 4; and the UAV 0 has a unidirectional communication relationship with UAVs 1 and 2, the UAV 0 being a sender of information.

Preferably, the camera is a monocular camera.

Further preferably, the monocular camera has a viewing angle of 90°.

Preferably, the light colors of the LED lights may be set by driver software.

The safe radius described in the present application is twice the radius of a circumscribed circle of a maximum contour of the UAV body.

Compared with the prior art, the present disclosure has the following beneficial effects.

According to the present disclosure, the nighttime cooperative visual positioning of UAV group is realized by means of the LED lights of UAVs and the two-dimensional turntable cameras, without adding additional equipment, without relying on GPS, laser radar and ultrasonic radar, and without relying on an external signal source, avoiding external interference. Compared with the positioning method in a conventional manner, in the present disclosure, the system is effectively simplified, and the cooperative positioning among the interiors of a UAV cluster can be realized relatively simply and at a low cost to maintain the formation of the UAV group.

BRIEF DESCRIPTION OF THE DRAWINGS

Other features, objects and advantages of the present disclosure will become more apparent by reading the detailed description of non-limiting examples with reference to the following drawings.

DETAILED DESCRIPTION

Hereinafter, the present disclosure will be further explained in detail with specific examples. The following examples will aid those skilled in the art in further understanding of the present disclosure, but do not limit the present disclosure in any way. It is to be pointed out that, for those of ordinary skill in the art, several variations and improvements can be made without departing from the concept of the present disclosure, which are all within the scope of protection of the present disclosure.

In the following, further details are given by means of specific implementations.

Figure 1:
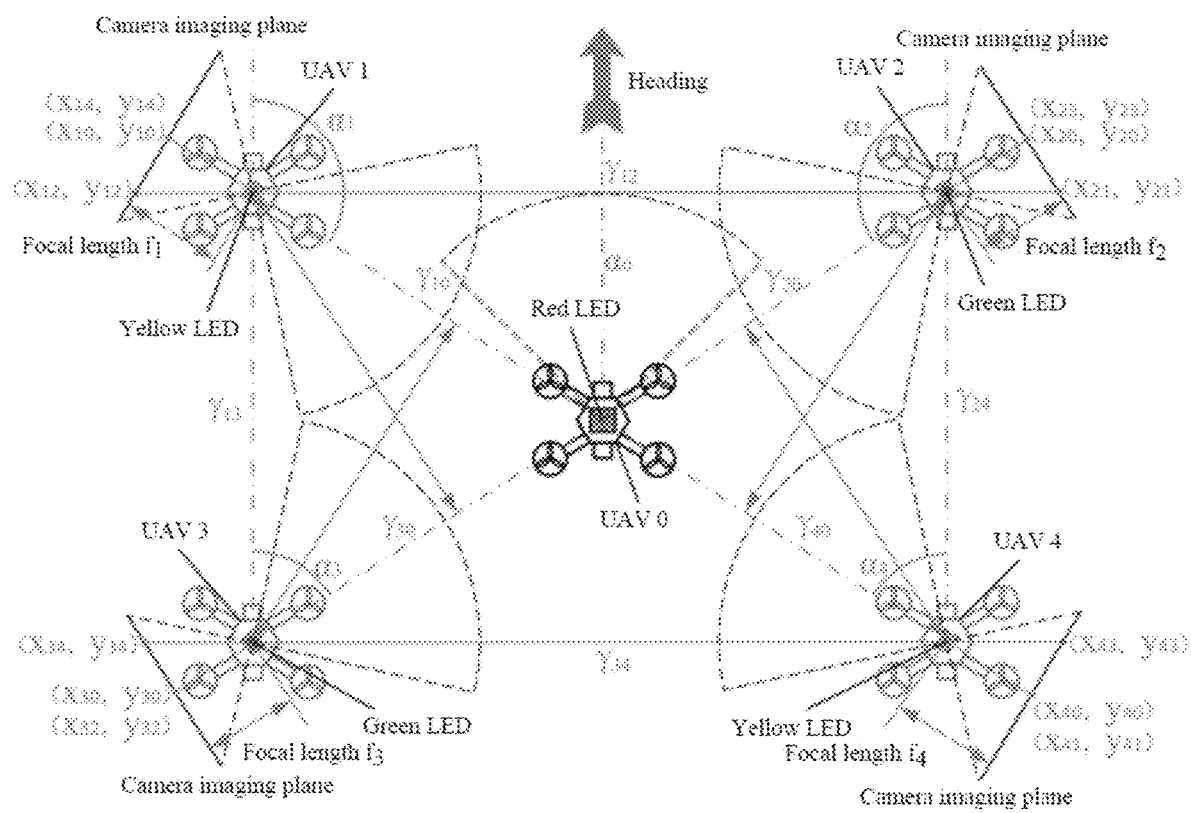
FIG. 1 is a technical solution diagram according to an example of the present disclosure.

In an example, a nighttime cooperative positioning method based on a UAV group is proposed. As shown in FIG. 1, one UAV group mainly includes 5 UAVs, each of the UAVs including a two-dimensional turntable monocular camera and an LED light. The monocular camera has a viewing angle of 90°, and the light colors of the LED lights may be set by driver software, as markers of the nighttime visual positioning.

Figure 3:
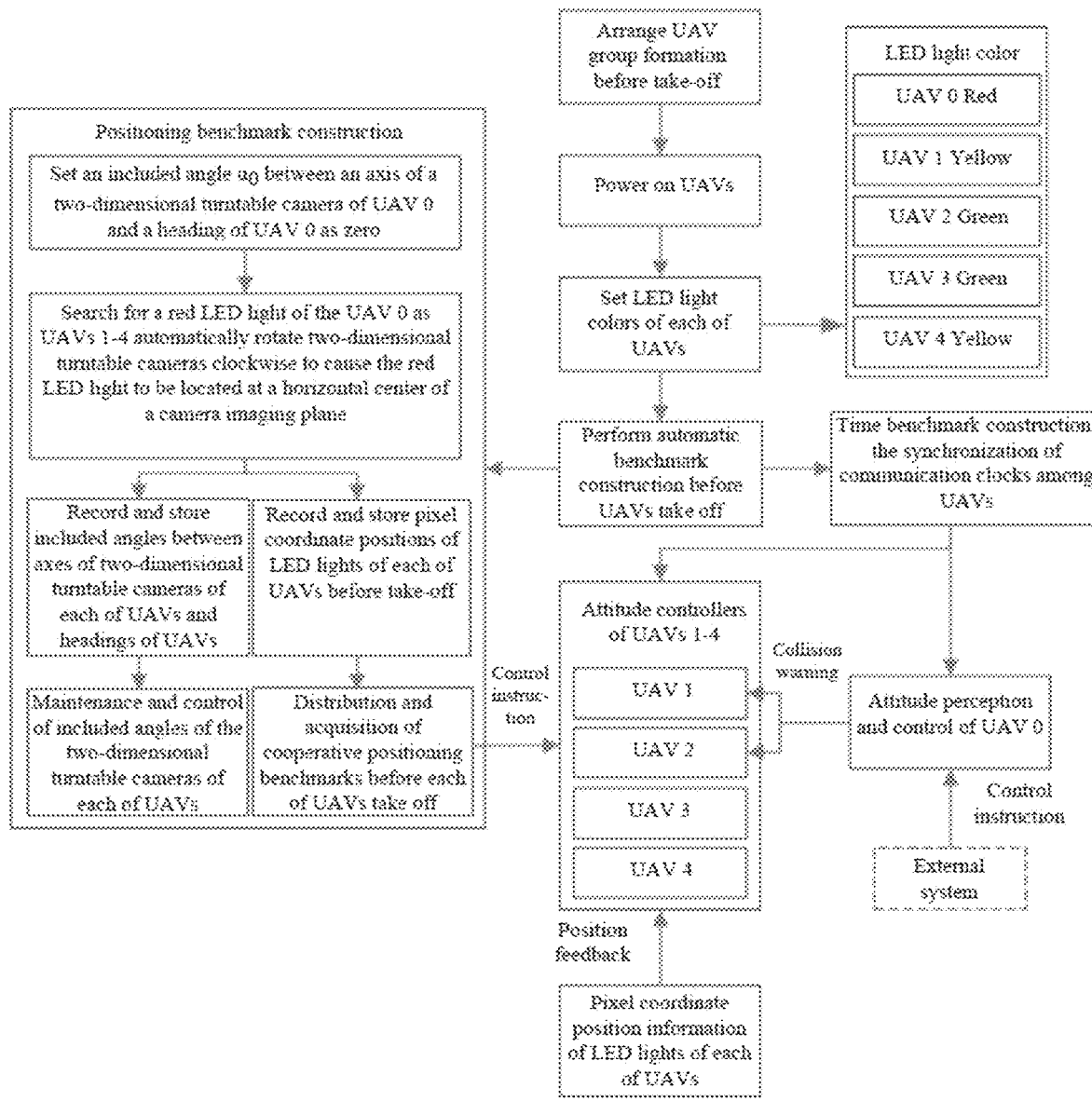
FIG. 3 is a work flow chart according to an example of the present disclosure.

The specific implementation flow chart is shown in FIG. 3, and the steps are as follows.

At step 1: an unmanned cluster formation is arranged before take-off.

Each of UAV groups is arranged at a take-off site according to a rectangular geometry formation shown in FIG. 1 to ensure that an initial actual distance ($\gamma 10$, $\gamma 20$, $\gamma 30$, $\gamma 40$, $\gamma 12$, $\gamma 13$, $\gamma 24$ or $\gamma 34$) among the UAVs is to be greater than a sum of safe radii of each other to avoid the risk of collision; and at the same time, to ensure that LED lights of the UAVs 1 and 2 are not present in a camera line-of-sight range of the UAV 0, $\gamma 10$ referring to an initial actual distance between the UAV 1 and the UAV 0, and so on.

At step 2: the unmanned cluster formation is powered on.

At step 3: the corresponding light colors of UAVs are set according to the requirements shown in FIG. 1.

Two UAVs on opposite corners of the rectangle are arranged with LED lights of color I, UAVs on the other opposite corners of the rectangle are arranged with LED lights of color II, and the UAV 0 is arranged with an LED light of color III, color I, color II and color III being different colors. In the example, the UAVs 1 and 4 located at the opposite corners of the rectangle are arranged with yellow LED lights, the UAVs 2 and 3 located at the other opposite corners of the rectangle are arranged with green LED lights, and the UAV 0 is arranged with a red LED light.

Description: the color setting of each of UAVs in the example is not limited to the colors described in FIG. 1, and all other color settings meeting the color distribution rule described in FIG. 1 are also feasible.

At step 4: the automatic benchmark construction is performed before the UAVs take off.

At step 4.1: the positioning benchmark construction is performed.

At step 4.1.1: an included angle $\alpha_0$ between an axis of the two-dimensional turntable camera of UAV 0 and a heading of UAV 0 is set as zero.

At step 4.1.2: the LED light with a red color of the UAV 0 is searched for as the UAVs 1-4 automatically rotate two-dimensional turntable cameras clockwise, to cause the LED light with the red color to be located at a horizontal center of the camera imaging plane.

At step 4.1.3: included angle values $\alpha_0$-$\alpha_4$ between axes of the two-dimensional turntable cameras of UAVs 0-4 and headings of UAVs 0-4 at this moment are recorded and stored. $\alpha_0$ is an included angle between an axis of the two-dimensional turntable camera of the UAV 0 and a heading of the UAV 0; $\alpha_1$ is an included angle between an axis of the two-dimensional turntable camera of the UAV 1 and a heading of the UAV 1; $\alpha_2$ is an included angle between an axis of the two-dimensional turntable camera of the UAV 2 and a heading of the UAV 2; $\alpha_3$ is an included angle between an axis of the two-dimensional turntable camera of the UAV 3 and a heading of the UAV 3; $\alpha_4$ is an included angle between an axis of the two-dimensional turntable camera of the UAV 4 and a heading of the UAV 4; and so on.

At step 4.1.4: a closed-loop maintenance control program of the included angle of the two-dimensional turntable camera is started to cause the included angle values of $\alpha_0$-$\alpha_4$ to be consistent with the recorded and stored values before take-off in the subsequent whole flight process.

At step 4.1.5: pixel coordinate values (x10, y10)-(x40, y40) of an LED red light spot of the UAV 0 in the camera imaging planes of the UAVs 1-4 at this moment are recorded and stored. The pixel coordinate value of the LED red light spot of the UAV 0 in the camera imaging plane of the UAV 1 is (x10, y10); the pixel coordinate value of the LED red light spot of the UAV 0 in the camera imaging plane of the UAV 2 is (x20, y20); the pixel coordinate value of the LED red light spot of the UAV 0 in the camera imaging plane of the UAV 3 is (x30, y30); the pixel coordinate value of the LED red light spot of the UAV 0 in the camera imaging plane of the UAV 4 is (x40, y40); and so on. At the same time, pixel coordinates (x12, y12) and (x21, y21) of the LED light of the UAVs 1 and 2 in the camera imaging planes of the other parties at this moment, and pixel coordinates (x34, y34) and (x43, y43) of the LED light of the UAVs 3 and 4 in the camera imaging planes of the other parties are recorded and stored. It is to be noted that due to light shielding, pixel coordinates (x14, y14) and (x41, y41) of the LED light of UAVs 1 and 4 in the camera imaging planes of the other parties coincide with (x10, y10) and (x40, y40), and pixel coordinates (x23, y23) and (x32, y32) of the LED light of UAVs 2 and 3 in the camera imaging planes of the other parties coincide with (x20, y20) and (x30, y30).

Figure 2:
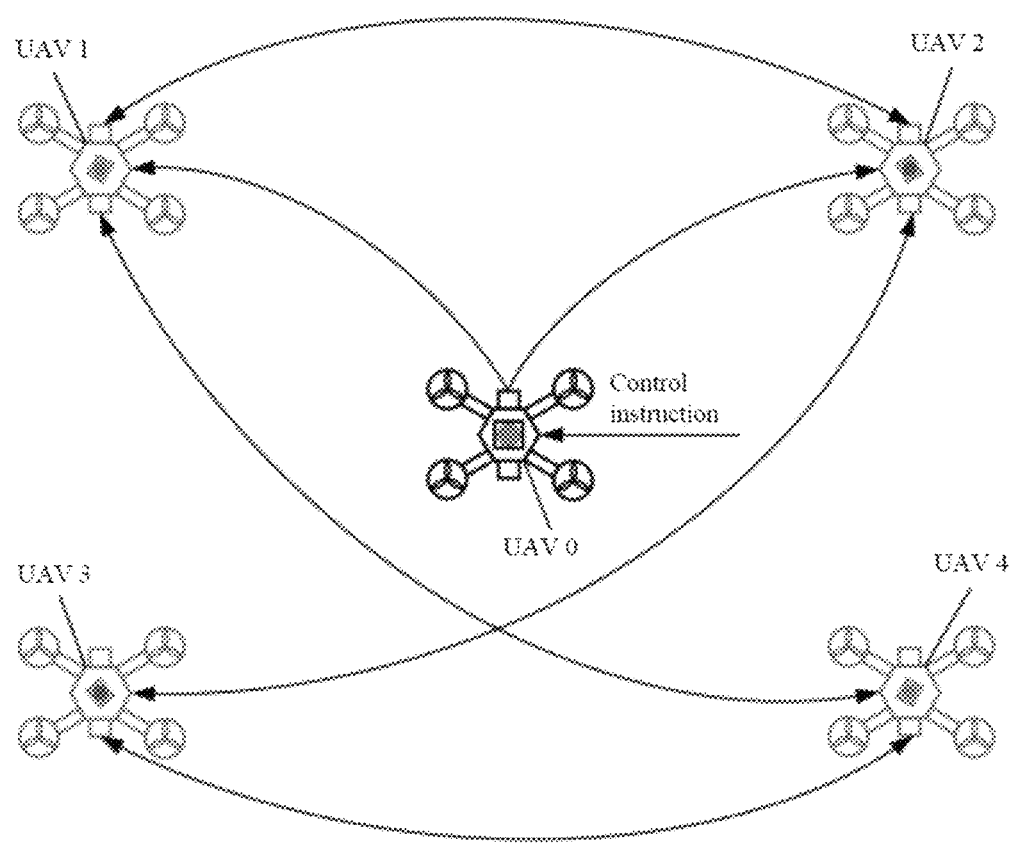
FIG. 2 is a directed graph of a communication topology according to an example of the present disclosure.

At step 4.1.6: pixel coordinates (x21, y21) and (x41, y41) of the UAV 1 in the camera imaging planes of the UAVs 2 and 4 are acquired by the UAV 1 to acquire cooperative positioning benchmark information of the UAV 1 in the cluster as {(x10, y10), (x21, y21), (x41, y41)} by means of a directed communication topology shown in FIG. 2; in a similar way, cooperative positioning benchmark information of the UAVs 2-4 in the cluster is acquired by the UAVs 2-4 as {(x20, y20), (x12, y12), (x32, y32)}, {(x30, y30), (x23, y23), (x43, y43) } and {(x40, y40), (x14, y14), (x34, y34)}; and the cooperative positioning benchmark information is taken as subsequent position control instructions of the UAVs 1-4. The directed communication topology describes the communication relationship between each of UAVs and other UAVs in the formation, and its directionality is manifested in the receiving and sending relationship of communication information between the UAVs. The arrow in FIG. 2 points to a receiver of information, that is, the UAV 1 has a bidirectional communication relationship with the UAVs 2 and 4; the UAV 3 has a bidirectional communication relationship with the UAVs 2 and 4; the UAV 1 has no communication relationship with the UAV 3, the UAV 2 has no communication relationship with the UAV 4; and the UAV 0 has a unidirectional communication relationship (sending or receiving) with UAVs 1 and 2.

At step 4.2: the time benchmark construction includes the synchronization of communication clocks among UAVs, ensuring the consistency of cooperative positioning of UAVs in the cluster.

At step 5: the vertical take-off of UAV 0 is controlled by a control instruction of an external system, and at the same time, an anti-collision warning instruction is sent by the UAV 0 to the UAV 1 or 2 through a communication topology when the LED light of the UAV 1 or 2 enters a camera viewing angle range of the UAV 0 in the flight process, that is, when an LED light pixel point of a yellow color or a green color appears in a camera imaging plane of the UAV 0, thereby avoiding the collision risk between the UAVs.

At step 6: real-time pixel coordinate values of the LED light with the red color of the UAV 0 in camera imaging planes of UAVs 1-4 are changing with the vertical take-off action of UAV 0, deviations between the real-time pixel coordinate values and pixel coordinate values (x10, y10)-(x40, y40) stored in the ground records of the UAVs 1-4 are calculated by attitude controllers of the UAVs 1-4 to finally follow the take-off action of UAV 0 by closed-loop control.

Supplementary note: in the flight process, the position change of any one of UAVs 1-4 leads to a deviation between a real-time monitored pixel coordinate value of the LED light of each of UAVs and the cooperative positioning benchmark, to cause the deviation to be zero or the control to be within a certain precision range by the attitude closed-loop controller to maintain the formation of the UAV group.

It is to be noted that, herein, relational terms such as "first" and "second" are only used to distinguish one entity or operation from another entity or operation, and do not necessarily require or imply that there is any such an actual relationship or order between these entities or operations. Moreover, the terms "including", "containing" or any other variations are intended to cover non-exclusive inclusion, so that a process, method, article or equipment including a series of elements includes not only those elements, but also other elements not explicitly listed or elements inherent to such a process, method, article or equipment.

It is to be noted that similar numerals and letters indicate similar items in the following drawings, so once an item is defined in one drawing, it does not need to be further defined and explained in subsequent drawings.

What has been described above is only the example of the present disclosure, and the common sense of the specific structure and characteristics known in the solution is not described here too much. Those of ordinary skill in the field know all the general technical knowledge of the technical field to which the present disclosure belongs before the application date or priority date, can know all the existing technologies in the field, and have the ability to apply the conventional experimental means before the date. Under the inspiration given by the present application, those of ordinary skill in the field can improve and implement the solution in combination with their own abilities. Some typical well-known structures or well-known methods are not to be an obstacle for those of ordinary skill in the field to implement the present application. It is to be pointed out that, for those skilled in the art, several variations and improvements can be made without departing from the structure of the present disclosure, which are also to be regarded as the scope of protection of the present disclosure, and these will not affect the implementation effect of the present disclosure and the practicability of the patent. The scope of protection claimed by the present application is to be subject to the contents of the claims, and the detail descriptions in the specification can be used to explain the contents of the claims.

The invention claimed is:
1. A nighttime cooperative positioning method based on an unmanned aerial vehicle (UAV) group, one UAV group comprising five UAVs, each of the five UAVs comprising a two-dimensional turntable camera and an LED light, and the method comprising the following steps:
   step 1: arranging an unmanned cluster formation before take-off
      arranging a UAV 1, a UAV 2, a UAV 3 and a UAV 4 of the UAV group according to a rectangular formation in sequence at a take-off site, and arranging a UAV 0 at a center of the rectangle, namely, an intersection point of diagonal lines of the rectangle, ensuring that an initial actual distance between adjacent UAVs is greater than a sum of safe radii of each other, and ensuring that LED lights of the UAVs 1 and 2 ahead of a heading of the UAV 0 are not present in a camera line-of-sight range of the UAV 0,
   step 2: powering on the unmanned cluster formation,
   step 3: setting LED light colors of each of the five UAVs
      setting the LED lights of two UAVs on opposite corners of the rectangle to be color I, setting the LED lights of two UAVs on the other opposite corners of the rectangle to be color II, and setting the LED light of the UAV 0 to be color III, color I, color II and color III being different colors,
   step 4: performing automatic benchmark construction before the five UAVs take off, comprising positioning benchmark construction and time benchmark construction,
   step 5: controlling the take-off of UAV 0 by a control instruction of an external system, and sending, by the UAV 0, an anti-collision warning instruction to the UAV 1 or 2 through a communication topology when the LED light of the UAV 1 or 2 enters a camera viewing angle range of the UAV 0 in a flight process, when an LED light pixel point with the color I or II appears in a camera imaging plane of the UAV 0, and
   step 6: real-time pixel coordinate values of the LED light with color III of the UAV 0 in the camera imaging planes of the UAV 1, UAV 2, UAV 3, and UAV 4 being changed with a take-off action of the UAV 0, calculating deviations between the real-time pixel coordinate values and pixel coordinate values (x10, y10), (x20, y20), (x30, y30), and (x40, y40) stored in ground records of the UAV 1, UAV 2, UAV 3, and UAV 4 by attitude controllers of the UAV 1, UAV 2, UAV 3, and UAV 4 to finally follow the take-off action of the UAV 0 by closed-loop control,
   the positioning benchmark construction specifically comprising the following steps:
      step 4.1.1: setting an included angle α0 between an axis of the two-dimensional turntable camera of the UAV 0 and a heading of the UAV 0 as zero;
      step 4.1.2: searching for the LED light with the color III of the UAV 0 as the UAV 1, UAV 2, UAV 3, and UAV 4 automatically rotate the two-dimensional turntable cameras clockwise, to cause the LED light with color III of the UAV 0 to be located at a horizontal center of the camera imaging plane;
      step 4.1.3: recording and storing included angle values α0, α1, α2, α3, and α4 between the axis of the two-dimensional turntable cameras of the UAV 1, UAV 2, UAV 3, and UAV 4 and headings of the UAV 1, UAV 2, UAV 3, and UAV 4;
      step 4.1.4: starting a closed-loop maintenance control program of the included angle of the two-dimensional turntable camera to cause the included angle values α0, α1, α2, α3, and α4 to be consistent with the recorded and stored values before the take-off in the flight process;
      step 4.1.5: recording and storing the pixel coordinate values (x10, y10), (x20, y20), (x30, y30), and (x40, y40) of an LED light spot with the color III of the UAV 0 in the camera imaging planes of the UAV 1, UAV 2, UAV 3, and UAV 4; and recording and storing a pixel coordinate value (x12, y12) of an LED light of the UAV 1 in the camera imaging plane of the UAV 2, a pixel coordinate value (x21, y21) of an LED light of the UAV 2 in the camera imaging plane of the UAV 1, a pixel coordinate value (x34, y34) of an LED light of the UAV 3 in the camera imaging plane of the UAV 4, and a pixel coordinate value (x43, y43) of an LED light of the UAV 4 in the camera imaging plane of the UAV 3; and
      step 4.1.6: acquiring, by the UAV 1, the pixel coordinates (x21, y21) and (x41, y41) of the UAV 1 in the camera imaging planes of the UAVs 2 and 4 to acquire cooperative positioning benchmark information of the UAV 1 in the cluster as {(x10, y10), (x21, y21), (x41, y41)} by means of a directed communication topology; in a similar way, acquiring, by the UAVs 2-4, the cooperative positioning benchmark information of the UAVs 2-4 in the cluster as {(x20, y20), (x12, y12), (x32, y32)}, {(x30, y30), (x23, y23), (x43, y43)} and {(x40, y40), (x14, y14), (x34, y34)}; and taking the cooperative positioning benchmark information as subsequent position control instructions of the UAV 1, UAV 2, UAV 3, and UAV 4; and
   the time benchmark construction comprising: a synchronization of communication clocks among the five UAVs.
2. The nighttime cooperative positioning method based on the UAV group according to claim 1, wherein in the flight process, the position change of any one of the UAV 1, UAV 2, UAV 3, and UAV 4 leads to the deviation between the real-time monitored pixel coordinate value of the LED light of each of the five UAVs and the cooperative positioning benchmark, to maintain the rectangular formation of the UAV group by the attitude closed-loop controller.
3. The nighttime cooperative positioning method based on the UAV group according to claim 1, wherein the directed communication topology in step 4.1.6 is specifically: the UAV 1 has a bidirectional communication relationship with the UAVs 2 and 4; the UAV 3 has a bidirectional communication relationship with the UAVs 2 and 4; the UAV 1 has no communication relationship with the UAV 3, the UAV 2 has no communication relationship with the UAV 4; and the UAV 0 has a unidirectional communication relationship with UAVs 1 and 2, the UAV 0 being a sender of information.

4. The nighttime cooperative positioning method based on the UAV group according to claim 1, wherein the camera is a monocular camera.

5. The nighttime cooperative positioning method based on the UAV group according to claim 4, wherein the monocular camera has a viewing angle of 90°.

6. The nighttime cooperative positioning method based on the UAV group according to claim 1, wherein the light colors of the LED lights may be set by driver software.

\* \* \* \* \*